US010244543B2

(12) United States Patent
Cariou et al.

(10) Patent No.: US 10,244,543 B2
(45) Date of Patent: Mar. 26, 2019

(54) STATION (STA), ACCESS POINT (AP) AND METHOD OF SPATIAL REUSE

(71) Applicant: Intel IP Corporation, Santa Clara, CA (US)

(72) Inventors: Laurent Cariou, Portland, OR (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 79 days.

(21) Appl. No.: 15/391,431

(22) Filed: Dec. 27, 2016

(65) Prior Publication Data

US 2018/0027573 A1 Jan. 25, 2018
US 2018/0368151 A9 Dec. 20, 2018

Related U.S. Application Data

(60) Provisional application No. 62/365,583, filed on Jul. 22, 2016, provisional application No. 62/333,975, filed on May 10, 2016.

(51) Int. Cl.
*H04W 72/08* (2009.01)
*H04W 52/36* (2009.01)
*H04W 72/04* (2009.01)
*H04W 84/12* (2009.01)

(52) U.S. Cl.
CPC ....... *H04W 72/085* (2013.01); *H04W 52/367* (2013.01); *H04W 84/12* (2013.01)

(58) Field of Classification Search
CPC ... H04W 52/36; H04W 52/367; H04W 72/04; H04W 72/0473; H04W 72/085; H04W 88/08

See application file for complete search history.

(56) References Cited

U.S. PATENT DOCUMENTS

| | | | |
|---|---|---|---|
| 2016/0302156 A1* | 10/2016 | Choi | H04W 52/146 |
| 2017/0041952 A1* | 2/2017 | Kim | H04W 74/08 |
| 2017/0201981 A1* | 7/2017 | Huang | H04W 72/0446 |
| 2017/0230837 A1* | 8/2017 | Huang | H04W 80/02 |
| 2017/0238310 A1* | 8/2017 | Huang | H04L 43/16 370/329 |
| 2017/0255659 A1* | 9/2017 | Cariou | G06F 17/30324 |
| 2017/0257344 A1* | 9/2017 | Huang | H04L 61/6022 |
| 2017/0289819 A1* | 10/2017 | Kim | H04W 16/14 |

(Continued)

*Primary Examiner* — Tri H Phan
(74) *Attorney, Agent, or Firm* — Schwegman Lundberg & Woessner, P.A.

(57) ABSTRACT

Embodiments of a station (STA), access point (AP) and method for determination of transmit power for spatial reuse are generally described herein. The STA may detect, in the channel, an overlapping basic service set (OBSS) physical layer convergence procedure protocol data unit (PPDU) from an OBSS AP. The STA may determine, based at least partly on an ESS color parameter included in the OBSS PPDU, whether the OBSS AP is included in the ESS network. The STA may determine an OBSS power threshold based at least partly on whether the OBSS AP is included in the ESS network. The STA may determine, based at least partly on a comparison between the OBSS power threshold and a received power of the OBSS PPDU, whether to transmit an uplink PPDU to the BSS AP in the channel during the TXOP.

21 Claims, 11 Drawing Sheets

(56) References Cited

U.S. PATENT DOCUMENTS

2017/0331697 A1* 11/2017 Cariou ................. H04W 72/08
2018/0007689 A1*  1/2018 Patil .................. H04W 72/0446
2018/0020478 A1*  1/2018 Derham ............ H04W 74/0808
2018/0132278 A1*  5/2018 Oteri .................... H04W 74/02

* cited by examiner

STATION (STA), ACCESS POINT (AP) AND METHOD OF SPATIAL REUSE

PRIORITY CLAIM

This application claims priority under 35 USC 119(e) to U.S. Provisional Patent Application Ser. No. 62/365,583, filed Jul. 22, 2016, which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi communications. Some embodiments relate to channel access. Some embodiments relate to spatial reuse. Some embodiments relate to channel access in accordance with omni-directional and/or directional patterns.

BACKGROUND

Wireless communications have been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11 ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
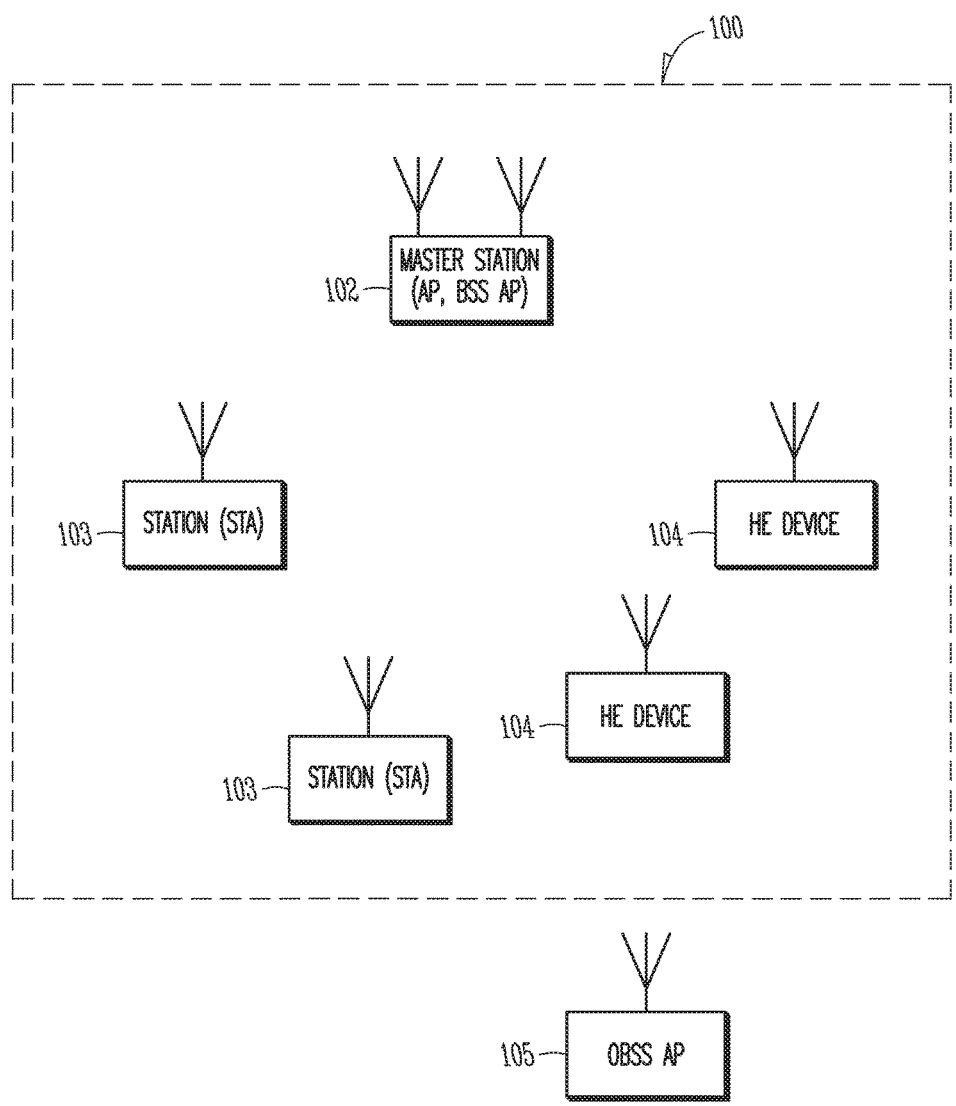
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non HE devices in some cases, and a combination of HE devices and non HE devices in some cases. Accordingly, it is understood that although techniques described herein may refer to either a non HE device or to an HE device, such techniques may be applicable to both non HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below.

In some embodiments, the AP 102 may be a basic service set (BSS) AP 102 configured to communicate with the STA 103 as part of an extended service set (ESS) network (100 in this example). One or more overlapping BSS (OBSS) APs 105 may be operational but not part of the ESS network 100, and may provide interference to the STA 103. In some embodiments, the OBSS APs 105 may be devices with which the STA 103 may not necessarily communicate. For instance, the STA 103 may not be associated with the OBSS APs 105 in some cases, but may still detect/receive packets from the OBSS APs 105. It should be noted that the OBSS AP 105 is illustrated as being outside of the ESS network 100 geographically in this example, but this is not limiting. In some cases, the OBSS APs 105 may be located within a coverage area of the ESS network 100 (and/or BSS APs of the ESS network 100). These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE stations 104 in accordance with one or more of the IEEE 802.11 standards, including 802.11 ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HE control period, the master station 102 may communicate with HE stations 104 using one or more HE PPDUs. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station 102 and/or HE stations 104 may generate an HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
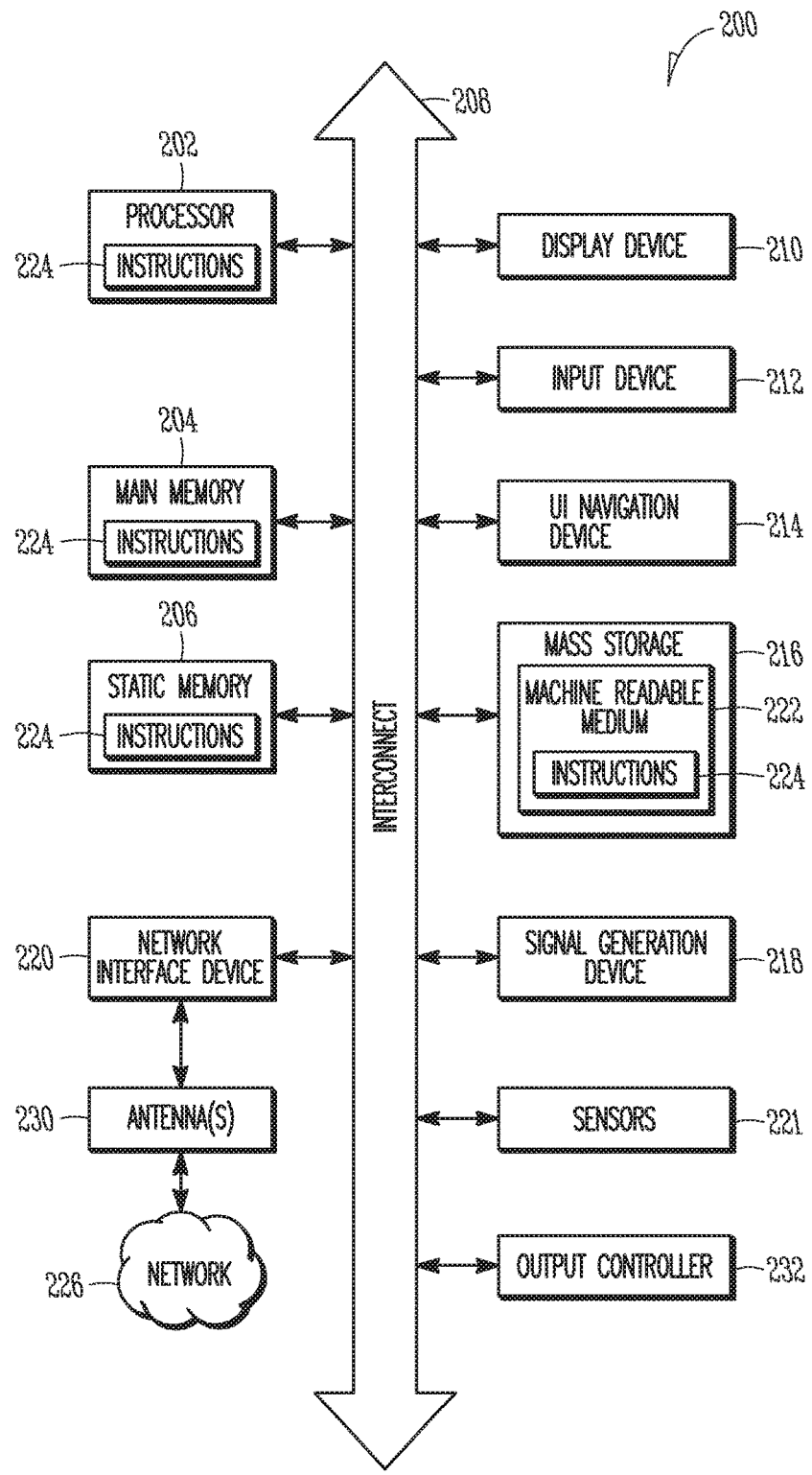
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
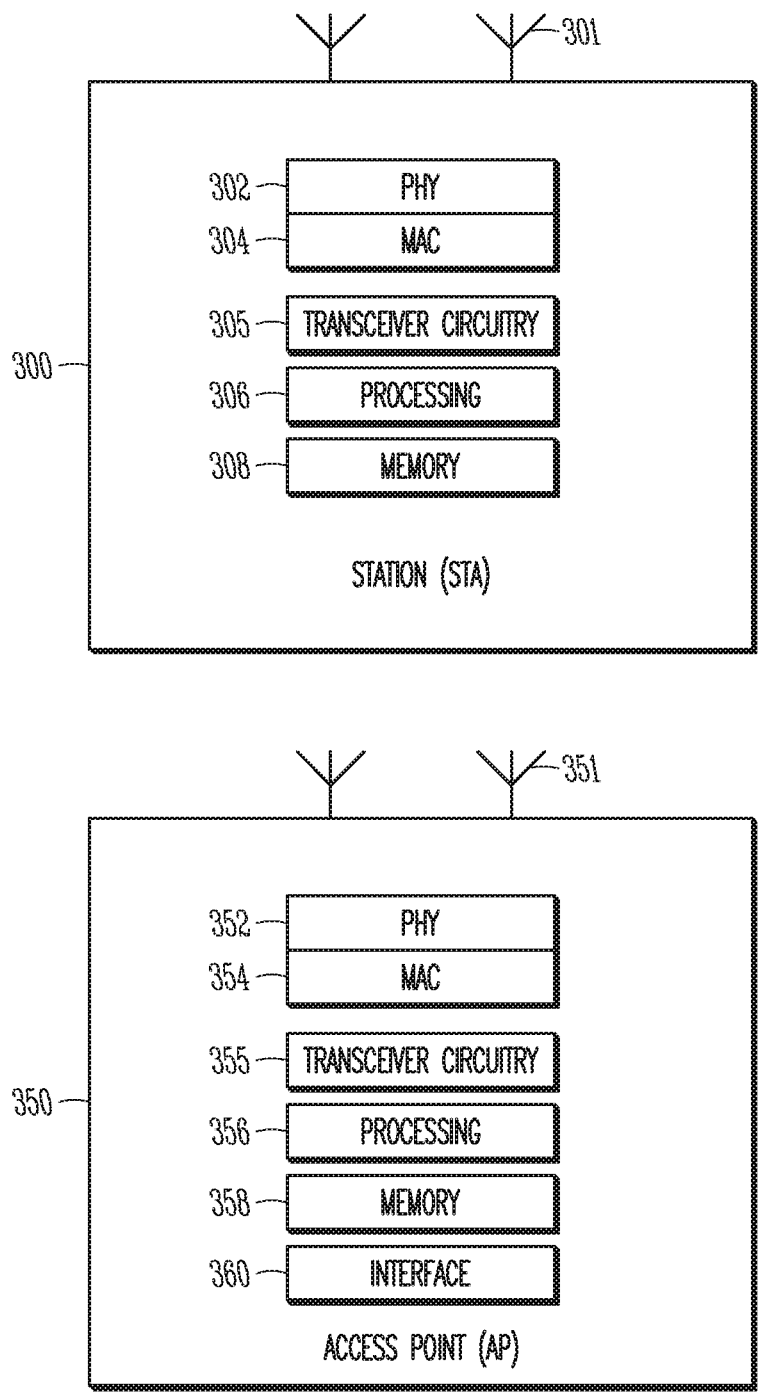
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

Figure 4:
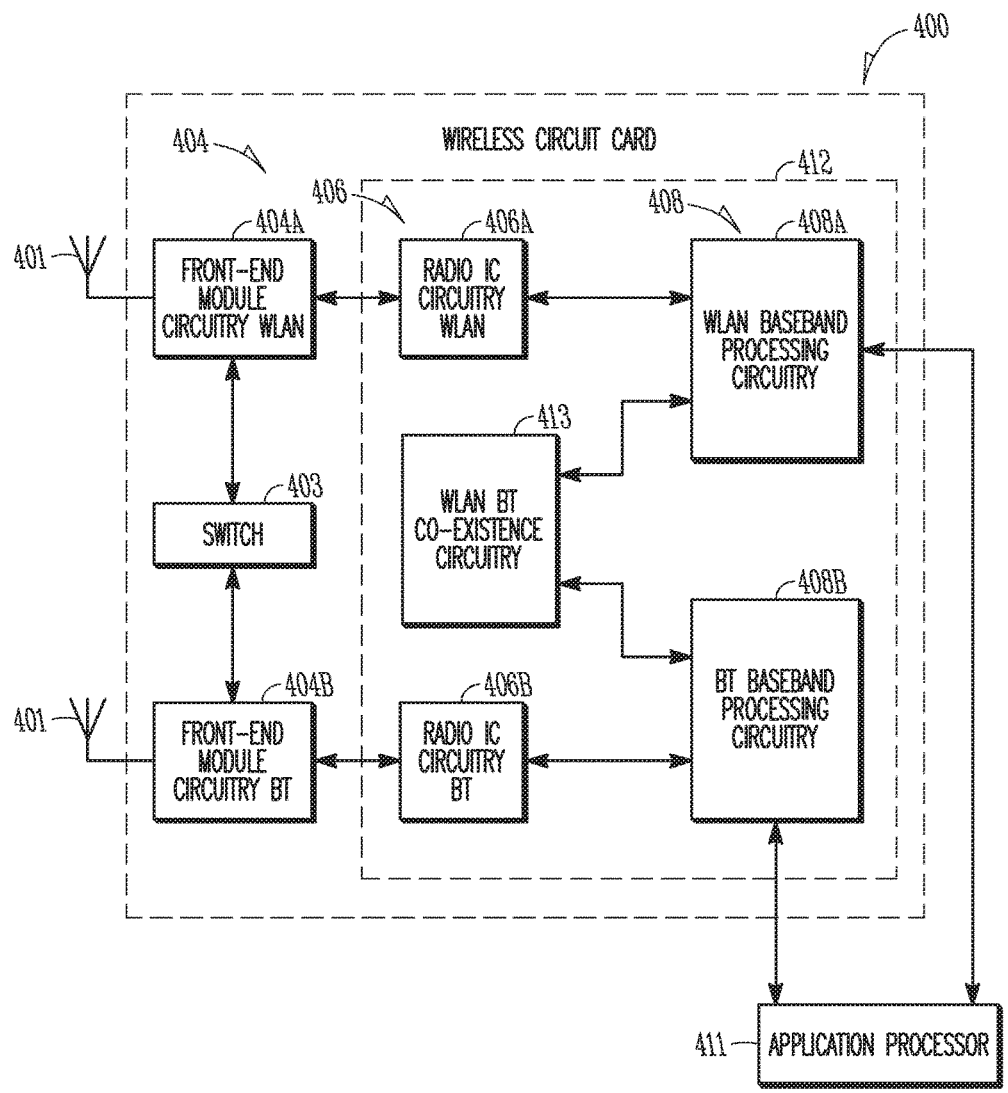
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 404 may include a WLAN or Wi-Fi FEM circuitry 404a and a Bluetooth (BT) FEM circuitry 404b. The WLAN FEM circuitry 404a may include a receive signal path comprising circuitry configured to operate on WLAN RF signals received from one or more antennas 401, to amplify the received signals and to provide the amplified versions of the received signals to the WLAN radio IC circuitry 406a for further processing. The BT FEM circuitry 404b may include a receive signal path which may include circuitry configured to operate on BT RF signals received from one or more antennas 402, to amplify the received signals and to provide the amplified versions of the received signals to the BT radio IC circuitry 406b for further processing. FEM circuitry 404a may also include a transmit signal path which may include circuitry configured to amplify WLAN signals provided by the radio IC circuitry 406a for wireless transmission by one or more of the antennas 401. In addition, FEM circuitry 404b may also include a transmit signal path which may include circuitry configured to amplify BT signals provided by the radio IC circuitry 406b for wireless transmission by the one or more antennas. In the embodiment of FIG. 4, although FEM 404a and FEM 404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406a and BT radio IC circuitry 406b. The WLAN radio IC circuitry 406a may include a receive signal path which may include circuitry to down-convert WLAN RF signals received from the FEM circuitry 404a and provide baseband signals to WLAN baseband processing circuitry 408a. BT radio IC circuitry 406b may in turn include a receive signal path which may include circuitry to down-convert BT RF signals received from the FEM circuitry 404b and provide baseband signals to BT baseband processing circuitry 408b. WLAN radio IC circuitry 406a may also include a transmit signal path which may include circuitry to up-convert WLAN baseband signals provided by the WLAN baseband processing circuitry 408a and provide WLAN RF output signals to the FEM circuitry 404a for subsequent wireless transmission by the one or more antennas 401. BT radio IC circuitry 406b may also include a transmit signal path which may include circuitry to up-convert BT baseband signals provided by the BT baseband processing circuitry 408b and provide BT RF output signals to the FEM circuitry 404b for subsequent wireless transmission by the one or more antennas 401. In the embodiment of FIG. 4, although radio IC circuitries 406a and 406b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 408 may include a WLAN baseband processing circuitry 408a and a BT baseband processing circuitry 408b. The WLAN baseband processing circuitry 408a may include a memory, such as, for example, a set of RAM arrays in a Fast Fourier Transform or Inverse Fast Fourier Transform block (not shown) of the WLAN baseband processing circuitry 408a. Each of the WLAN baseband circuitry 408a and the BT baseband circuitry 408b may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408a and 408b may further include physical layer (PHY) and medium access control layer (MAC) circuitry, and may further interface with application processor 410 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408a and the BT baseband circuitry 408b to enable use cases requiring WLAN and BT coexistence. In addition, a switch 403 may be provided between the WLAN FEM circuitry 404a and the BT FEM circuitry 404b to allow switching between the WLAN and BT radios according to application needs. In addition, although the antennas 401 are depicted as being respectively connected to the WLAN FEM circuitry 404a and the BT FEM circuitry 404b, embodiments include within their scope the sharing of one or more antennas as between the WLAN and BT FEMs, or the provision of more than one antenna connected to each of FEM 404a or 404b.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 5:
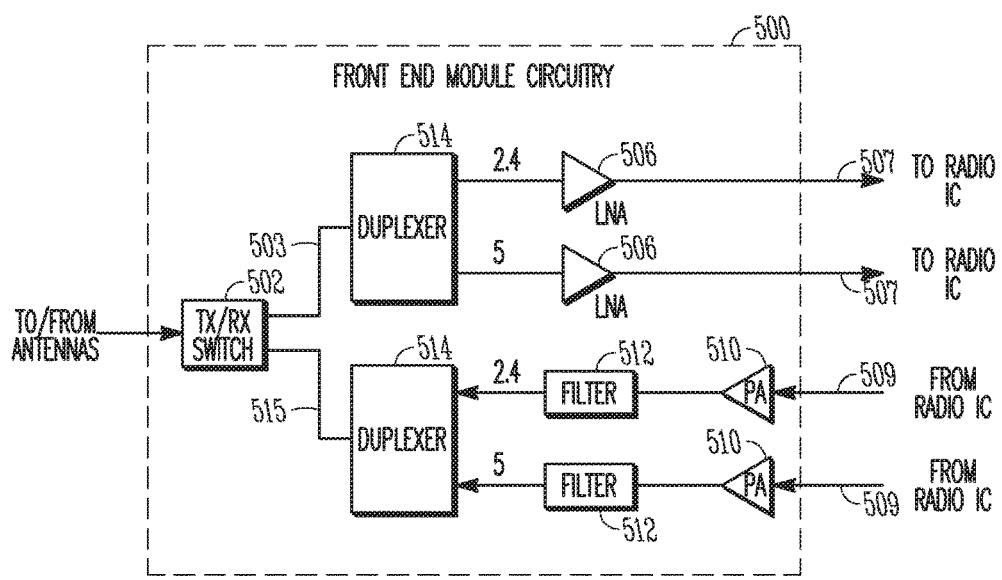
FIG. 5 illustrates a front-end module circuitry for use in the radio architecture of FIG. 4 in accordance with some embodiments.

FIG. 5 illustrates FEM circuitry 500 in accordance with some embodiments. The FEM circuitry 500 is one example of circuitry that may be suitable for use as the WLAN and/or BT FEM circuitry 404a/404b (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

Figure 6:
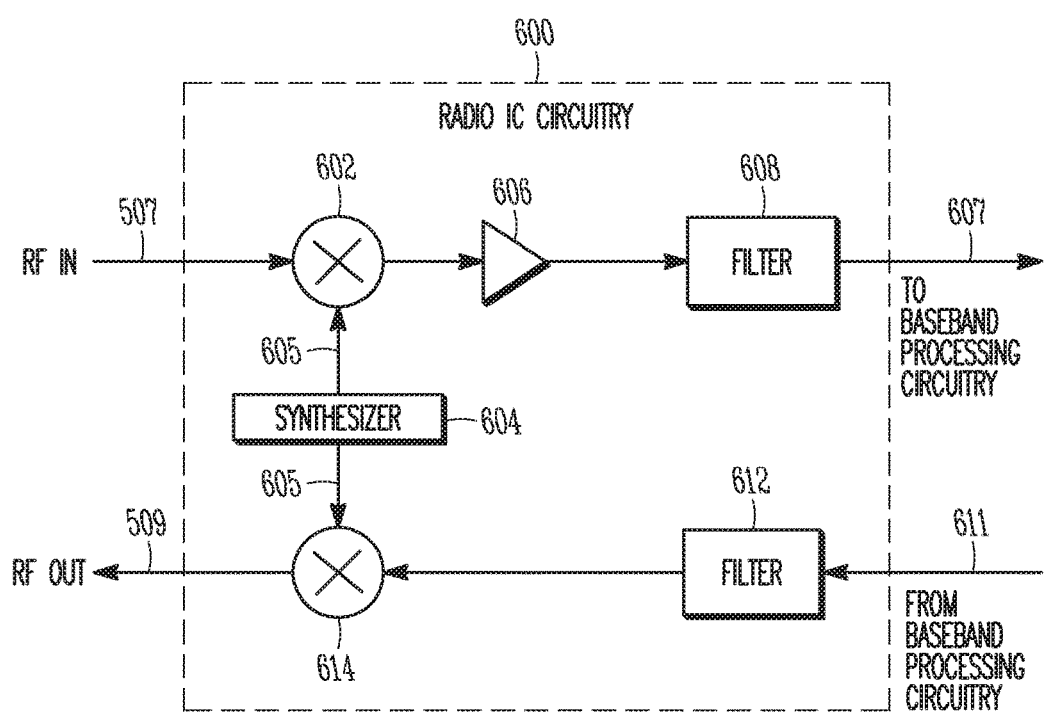
FIG. 6 illustrates a radio IC circuitry for use in the radio architecture of FIG. 4 in accordance with some embodiments.

FIG. 6 illustrates radio IC circuitry 600 in accordance with some embodiments. The radio IC circuitry 600 is one example of circuitry that may be suitable for use as the WLAN or BT radio IC circuitry 406a/406b (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 620 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency (fLo) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 604 may be provided by a voltage controlled oscillator (VCO), although that is not a requirement. A divider control input may further be provided by either the baseband processing circuitry 408 (FIG. 4) or the application processor 410 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 410.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency (fwL).

Figure 7:
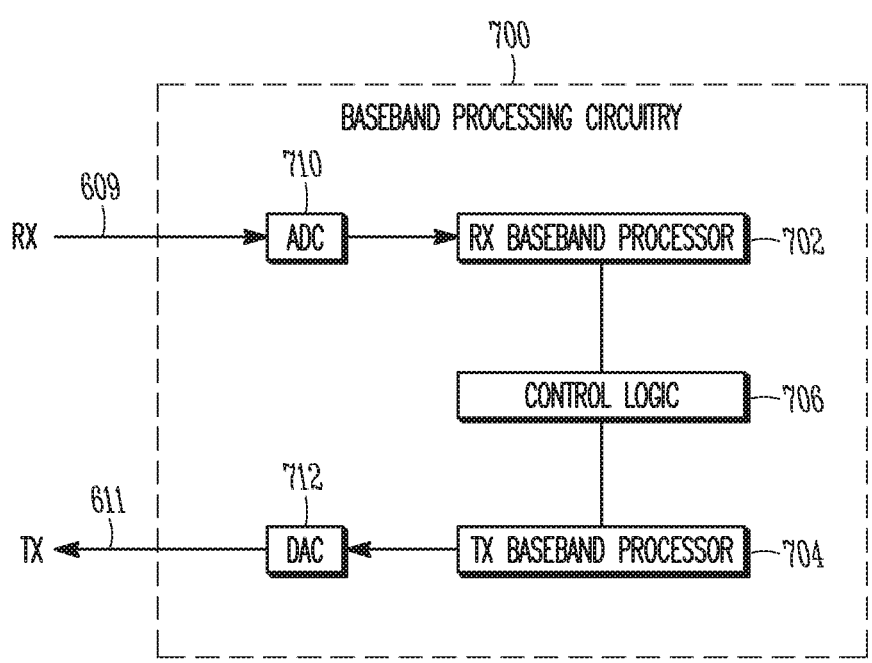
FIG. 7 illustrates a baseband processing circuitry for use in the radio architecture of FIG. 4 in accordance with some embodiments.

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4)

and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408a, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In accordance with some embodiments, the STA 103 may receive a trigger frame (TF) in a channel from a basic service set (BSS) AP 102 during a transmission opportunity (TXOP) obtained by the BSS AP 102. The BSS AP 102 may be included in an extended service set (ESS) network. The STA may detect, in the channel, an overlapping basic service set (OBSS) physical layer convergence procedure protocol data unit (PPDU) from an OBSS AP 105. The STA 103 may determine a received OBSS power based at least partly on the OBSS PPDU. The STA may determine, based at least partly on an ESS color parameter included in the OBSS PPDU, whether the OBSS AP 105 is included in the ESS network. If it is determined that the OBSS AP 105 is included in the ESS network, the STA 103 may select a first predetermined value for an OBSS power threshold. If it is determined that the OBSS AP 105 is not included in the ESS network, the STA 103 may select a second predetermined value for the OBSS power threshold. The STA 103 may determine, based at least partly on a comparison between the received OBSS power and the OBSS power threshold, whether to transmit an uplink PPDU to the BSS AP 102 in the channel during the TXOP. These embodiments will be described in more detail below.

Figure 8:
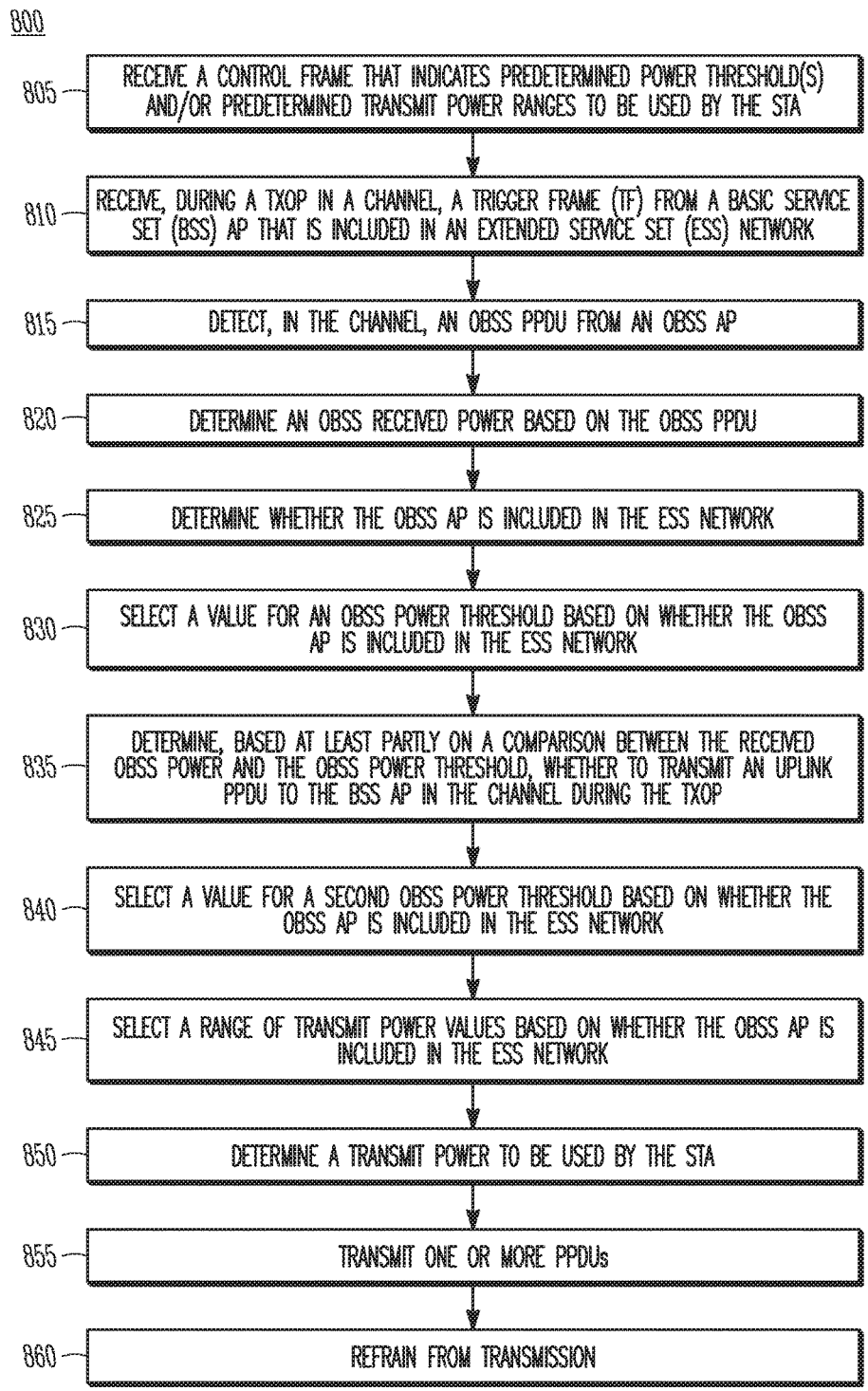
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-12, although it is understood that the method 800 may be practiced with any other suitable systems, interfaces and components.

In some embodiments, the AP 102 and/or STA 103 may be configurable to operate as an HE device 104. Although reference may be made to an AP 102 and/or STA 103 herein, including as part of the descriptions of the method 800 and/or other methods described herein, it is understood that an HE device 104, an AP 102 configurable to operate as an HE device 104 and/or STA 103 configurable to operate as an HE device 104 may be used in some embodiments. In addition, the method 800 and other methods described herein may be applicable to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 800 and other methods described herein may be practiced by other mobile devices, such as an Evolved Node-B (eNB) or User Equipment (UE). The method 800 and other methods described herein may also be practiced by wireless devices configured to operate in other suitable types of wireless communication systems, including systems configured to operate according to various Third Generation Partnership Project (3GPP) Long Term Evolution (LTE) standards. The method 800 may also be applicable to an apparatus for an STA 103, HE device 104 and/or AP 102 or other device described above, in some embodiments.

It should also be noted that embodiments are not limited by references herein (such as in descriptions of the methods 800, 1100 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 805 of the method 800, the STA 103 may receive one or more control frames from an AP 102. The control frame(s) may include one or more parameters to be used by the STA 103 for operations related to determination of a transmit power to be used by the STA 103, other operations of the method 800 and/or other operations. Example parameters may include, but are not limited to, predetermined power threshold(s); predetermined transmit power ranges to be used by the STA 103; one or more overlapping basic service set (OBSS) thresholds; a mapping between OBSS power and transmit power to be used by the STA 103 and/or related parameters; a range, minimum, maximum and/or other parameter(s) related to transmit power of the STA 103; and/or other parameters. Examples will be described herein. Embodiments are not limited to usage of control frame(s), as management frame(s), beacon frame(s), other frame(s) and/or other messages may be used in some embodiments.

In some embodiments, the control frame(s) may be received from a basic service set (BSS) access point (AP) to which the STA 103 communicates. In some embodiments, the control frame(s) may be received from a BSS AP to which the STA 103 intends to transmit a frame, signal and/or other element. In some embodiments, the control frame(s) may be received from a BSS AP to which the STA 103 is associated. The control frame(s) may be received at any suitable time. The BSS AP may be included in an extended service set (ESS) network, in some embodiments.

At operation 810, the STA 103 may receive a trigger frame (TF) from the BSS AP 102 in a channel. In some embodiments, the TF may be received during a TXOP obtained by the BSS AP 102. The TF may indicate scheduling information for uplink transmissions and/or downlink transmissions, may schedule one or more uplink transmissions and/or downlink transmissions, may include information related to channel resources (such as resource units (RUs), subchannels and/or other) to be used for the uplink transmissions and/or downlink transmissions, time resources to be used for the uplink transmissions and/or downlink transmissions and/or other information.

At operation 815, the STA 103 may detect, in the channel, an OBSS physical layer convergence procedure protocol data unit (PPDU) from an OBSS AP. In some embodiments, the OBSS PPDU may be detected as part of channel sensing, although the scope of embodiments is not limited in this respect. The STA 103 may decode the OBSS PPDU (or at least a portion of it, such as one or more fields of a header), in some cases.

At operation 820, the STA 103 may determine a received OBSS power based at least partly on the OBSS PPDU. For instance, a received power level of the OBSS PPDU at the STA 103 may be used. An average received power may be used, although embodiments are not limited as such, as any suitable power measurement may be used. The power measurement may be based on the received OBSS PPDU, although the scope of embodiments is not limited in this respect. In some embodiments, the power measurement may be based on previously received OBSS PPDUs from the OBSS AP, such as an average power over multiple OBSS PPDUs.

At operation 825, the STA 103 may determine whether the OBSS AP is included in the ESS network in which the BSS AP 102 is included. The determination may be based at least partly on an ESS color parameter included in the OBSS PPDU. For instance, the STA 103 may decode the OBSS PPDU or at least an ESS color parameter included in the OBSS PPDU. The ESS network in which the BSS AP 102 is included may have a particular ESS color that is known to the STA 103. The STA 103 may compare that ESS color with the decoded ESS color parameter in the OBSS PPDU. Accordingly, the STA 103 may determine whether the OBSS AP that transmits the OBSS PPDU is or is not included in the ESS network to which the BSS AP 102 is included.

In some embodiments, the ESS color parameter may be included in a high efficiency (HE) signal (HE-SIG) field of the OBSS PPDU. Embodiments are not limited to inclusion of the ESS color parameter in the HE-SIG field, however. For instance, the ESS color parameter may be included in any field of a header, in a payload and/or in another element of the OBSS PPDU, in some cases. In a non-limiting example, the HE-SIG field may be a SIG-A field. 10088o In some embodiments, a particular value of the ESS color parameter may indicate whether the OBSS AP is included in the ESS network (in which the BSS AP 102 is included). In addition, another particular value of the ESS color parameter may indicate whether the OBSS AP is an unmanaged AP not included in an ESS network.

The OBSS PPDU may further include a BSS color parameter that indicates the BSS AP 102, in some embodiments. The BSS color parameter may be included in any field of a header, in a payload and/or in another element of the OBSS PPDU, in some cases. In a non-limiting example, the HE-SIG field may also include the BSS color parameter.

At operation 830, the STA 103 may select a value for an OBSS power threshold. The value for the OBSS power threshold may be selected based on whether the OBSS AP is included in the ESS network, in some embodiments. In a non-limiting example, it is determined that the OBSS AP is included in the ESS network, the STA 103 may select a first predetermined value for the OBSS power threshold. If it is determined that the OBSS AP is not included in the ESS network, the STA 103 may select a second predetermined value for the OBSS power threshold.

At operation 835, the STA 103 may determine, based at least partly on a comparison between the received OBSS power and the OBSS power threshold, whether to transmit an uplink PPDU to the BSS AP in the channel during the TXOP. In a non-limiting example, the OBSS power threshold may be a maximum OBSS power threshold that may be used to determine whether the STA 103 is to transmit a PPDU. The STA 103 may determine that the STA 103 is to transmit the uplink PPDU if the received OBSS power is less than or equal to the OBSS power threshold. The STA 103 may further determine that the STA is to refrain from transmission of the uplink PPDU if the received OBSS power is greater than the OBSS power threshold.

In some cases, the first predetermined value for the OBSS power threshold may be greater than the second predetermined value for the OBSS power threshold. Continuing the previous example, the selection of the first value may result in less restrictive transmission by the STA 103 in comparison to when the second value is selected. That is, more opportunities to transmit may be realized by the STA 103 when the first value is selected (as it is higher than the second value). For instance, the higher value (first value) may be used for a more aggressive strategy. In addition, the first value may be selected, in this example, when the OBSS AP is included in the same ESS network. Accordingly, the ESS network may have more control and/or insight into effects of spatial transmission on other APs 102 of the ESS network in comparison to APs 102 of other networks or unmanaged APs, in some cases.

At operation 840, the STA 103 may select a value for a second power OBSS power threshold based on whether the OBSS AP is included in the ESS network. The OBSS power threshold previously described at operation 835 (for determination of whether the STA 103 is to transmit) may be a first OBSS power threshold. In some embodiments, the second OBSS power threshold may be less than the first OBSS power threshold. Accordingly, the first OBSS power threshold may be a maximum power threshold and the second OBSS power threshold may be a minimum power threshold, in some cases. The second OBSS power threshold may be selected (perhaps differently) based on whether the OBSS AP that transmits the OBSS PPDU is in the ESS network. The STA 103 may use the second OBSS power threshold for operations such as determination of whether to transmit, selection of a transmit power and/or other(s), in some cases.

In some embodiments, if it is determined that the OBSS AP is included in the ESS network, the STA 103 may select a first predetermined value for the second OBSS power threshold. If it is determined that the OBSS AP is not included in the ESS network, the STA 103 may select a second predetermined value for the second OBSS power threshold.

In some embodiments, the STA 103 may receive one or more control frames, management frames, beacon frames and/or other frames/messages from the BSS AP 102 that may include any or all of: the first value for the first OBSS power threshold, the second value for the first OBSS power threshold, the first value for the second OBSS power threshold, and the second value for the second OBSS power threshold. In some embodiments, memory of the STA 103 (and/or memory of an apparatus for the STA 103) may be configurable to store one or more of those threshold values.

It should be noted that the STA 103 may not necessarily perform all operations. The STA 103 may use (and/or select) either of the first or second OBSS power thresholds, neither of them or both of them.

At operation 845, the STA 103 may select and/or determine a range of transmit power values based on whether the OBSS AP is included in the ESS network. The range may be determined based at least partly on one or more factors, such as the first OBSS power threshold, the second OBSS power threshold, a mapping between one or more OBSS powers and one or more STA 103 transmit powers. In some embodiments, the range of transmit power values may be predetermined. In some embodiments, the range of transmit power values may be included in a standard.

At operation 850, the STA 103 may determine a transmit power to be used by the STA 103, such as for transmission of a PPDU to the BSS AP 102. In some embodiments, if it is determined that the OBSS AP is included in the ESS network, the STA 103 may select a first predetermined range of values for the transmit power for the uplink PPDU. If it is determined that the OBSS AP is not included in the ESS network, the STA 103 may select a second predetermined range of values for the transmit power for the uplink PPDU. The transmit power may be determined based on a mapping between the received OBSS power and the selected range of values for the transmit power of the uplink PPDU. In a non-limiting example, at least a portion of the first range of values may be greater than the values of the second range.

In some embodiments, if the received OBSS power is less than or equal to the first OBSS power threshold and if the received OBSS power is greater than the second OBSS power threshold, the STA 103 may determine the transmit power for the uplink PPDU in accordance with an inverse linear mapping between the transmit power and the received OBSS power value. In some cases, the first OBSS power threshold may be greater than the second OBSS power threshold, although the scope of embodiments is not limited in this respect.

In some embodiments, for at least some values of the detected OBSS power, the transmit power of the STA 103 may be determined as (A−detected OBSS power), in which "A" is a constant and/or predetermined number. For instance, if a value of 10 dBm is mapped to a received OBSS power of −62 dBm, the transmit power of the STA 103 (for at least a range of values) may be −52 dBm minus the received OBSS power.

In some cases, saturation cases may be included in the mapping between transmit power of the STA 103 and the received OBSS power. For instance, a maximum transmit power of the STA 103 may be used and the determined transmit power may not increase above that maximum value, even as the received OBSS power is decreased. For instance, a maximum value of 30 dBm may be used for the transmit power of the STA 103 for values of received OBSS power below −82 dBm.

In some embodiments, the transmit power for the uplink PPDU may be selected based at least partly on a difference between the received OBSS power and the first OBSS power threshold (the higher of the first and second thresholds).

At operation 855, the STA 103 may transmit one or more uplink PPDUs. In some embodiments, the uplink PPDUs may be transmitted if it is determined (such as by the comparison of operation 835) that the STA 103 is to transmit the one or more uplink PPDUs. The one or more uplink PPDUs may be transmitted during the TXOP in the channel, in some cases. In addition, the one or more uplink PPDUs may be transmitted in accordance with information included in the TF. The one or more uplink PPDUs may be transmitted in accordance with the determined transmit power for the STA 103.

At operation 860, the STA 103 may refrain from transmission. In some embodiments, the STA 103 may refrain from transmission if it is determined (such as by the comparison of operation 835) that the STA 103 is to refrain from transmission.

In some embodiments, the STA 103 may determine, based at least partly on an ESS color parameter included in the OBSS PPDU, whether the OBSS AP is managed by the ESS network. The ESS network may manage the BSS AP 102 to which the STA 103 is associated. The STA 103 may select either a first set or a second set of transmission parameter values based on whether the OBSS AP is managed by the ESS network. The STA 103 may determine a received OBSS power based on the detection of the OBSS PPDU. The STA 103 may determine, based on the selected set of transmission parameter values and the received OBSS power, an uplink transmit power to be used by the STA 103 for an uplink transmission to the BSS AP 102 in the channel. The set of transmission parameters may include at least an upper OBSS power threshold and a lower OBSS power threshold. The STA 103 may determine the uplink transmit power based on a mapping between the uplink transmit power and the received OBSS power. In the mapping, in a range of the received OBSS power between the upper and lower OBSS power thresholds, the corresponding uplink transmit power may decrease as the received OBSS power increases.

Figure 9:
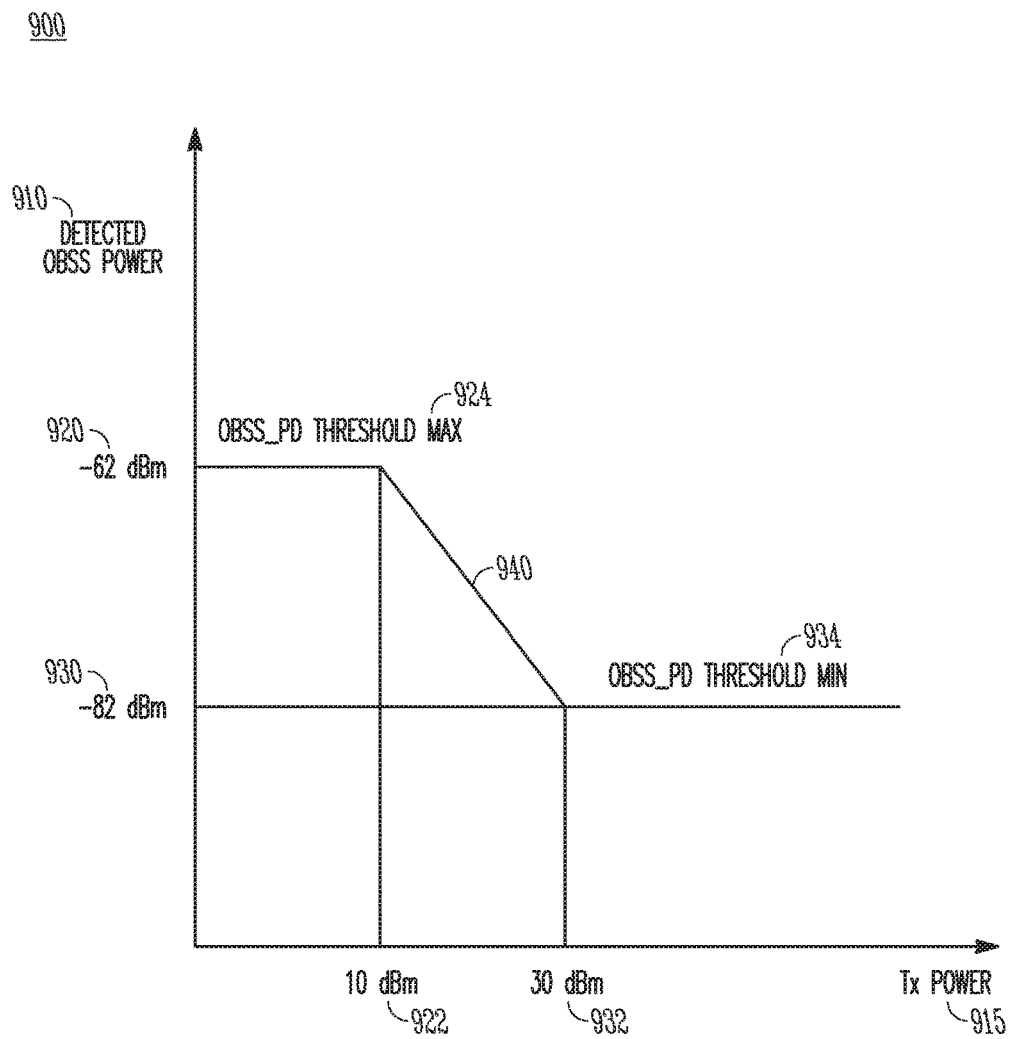
FIG. 9 illustrates an example mapping between transmit power and detected power in accordance with some embodiments.
Figure 10:
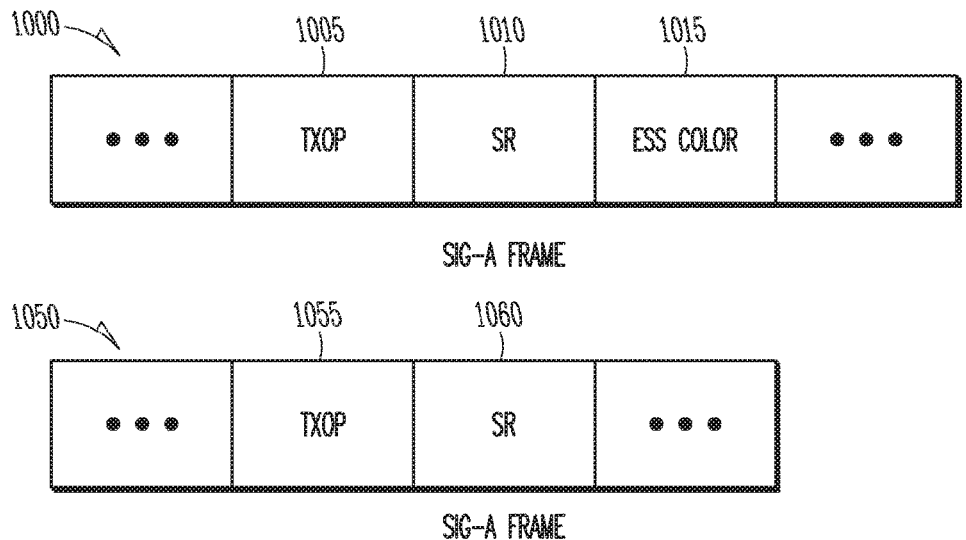
FIG. 10 illustrates example header fields in accordance with some embodiments.
Figure 11:
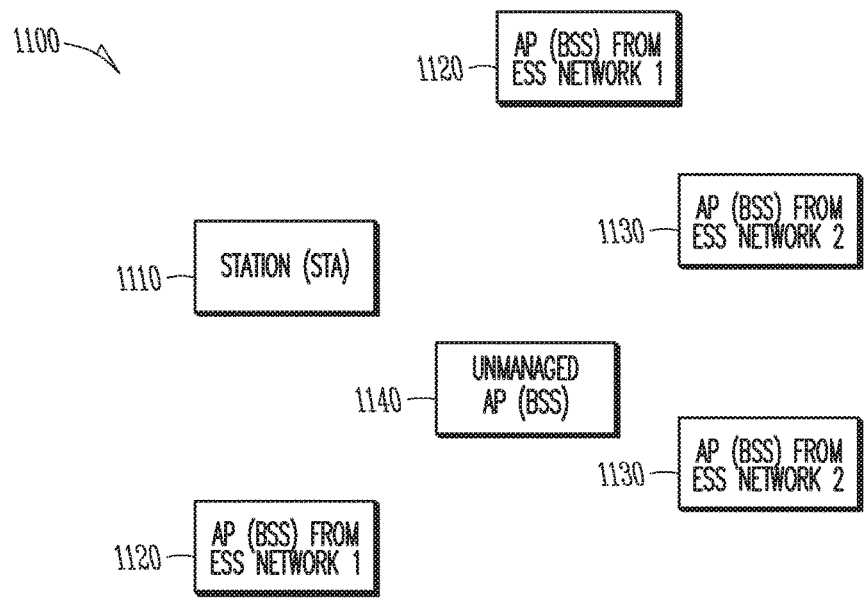
FIG. 11 illustrates an example scenario in accordance with some embodiments.

FIG. 9 illustrates an example mapping between transmit power and detected power in accordance with some embodiments. FIG. 10 illustrates example header fields in accordance with some embodiments. FIG. 11 illustrates an example scenario in accordance with some embodiments. It should be noted that the examples shown in FIGS. 9-11 may illustrate some or all of the concepts and techniques described herein in some cases, but embodiments are not limited by the examples of FIGS. 9-11. For instance, embodiments are not limited by the name, number, type, size, ordering, arrangement and/or other aspects of the components, networks, functions, mappings, parameters, frames, signals, fields, data blocks, operations, and other elements as shown in FIGS. 9-11. Although some of the elements shown in the examples of FIGS. 9-11 may be included in an 802.11 standard and/or other standard, embodiments are not limited to usage of such elements that are included in standards.

In some embodiments, spatial reuse may be performed, in which the STA 103 may transmit in the presence of a detected OBSS signal/PPDU. A rule, function and/or mapping between a transmit power of an STA 103 and a detected OBSS power may be used, in some cases. Such a rule, function and/or mapping may be referred to herein, without limitation, as a "spatial reuse proportional function" or similar.

An example spatial reuse proportional function is shown in FIG. 9. It should be noted that embodiments are not limited to this example. For instance, different parameters may be used. In addition, some embodiments may refer to such a mapping and may also refer to parameters like those shown in FIG. 9, but it is understood that the STA 103 transmit power may be determined using other techniques, in addition to or instead of usage of a direct mapping. For instance, the STA 103 transmit power may be determined based at least partly on the detected OBSS power in a manner that may not necessarily be represented by a direct mapping.

Referring to FIG. 9, an example mapping between STA 103 transmit power and detected OBSS power is shown. In some cases, parameters of the mapping may be different for different ESS networks, and may be used by the STA 103 to determine STA 103 transmit power. For instance, the OBSS PD threshold max 924 (which may be referred to herein as an OBSS power threshold, upper OBSS power threshold and/or other), OBSS PD threshold min 934 (which may be referred to herein as an OBSS power threshold, lower OBSS power threshold and/or other), other thresholds, a range of STA 103 transmit power of a linear range 940 (such as between 922 and 932), a shape of the curve and/or other parameters may be different (and/or configurable) for different ESS networks.

In addition, particular values of the detected OBSS power and corresponding STA 103 transmit power may be given. For instance, in the example mapping 900, a value 920 of −62 dBm detected OBSS power corresponds to an STA 103 transmit power 922 of 10 dBm. A value 930 of −82 dBm detected OBSS power corresponds to an STA 103 transmit power 932 of 30 dBm in the example mapping 900. These parameters may have different values for different ESS networks.

In some embodiments, the spatial reuse proportional function may be different depending on factors such as an environment, whether the OBSS is unmanaged or part of a managed network, whether the base stations active in the environment are dense or not. In some cases, some adaptation of the spatial reuse proportional function (and perhaps other rules, functions and/or mappings) may be performed. For instance, one or more parameters of the spatial reuse proportional function may be tuned and/or defined by the AP 102 (such as the BSS AP 102 with which the STA 103 is associated).

In some embodiments, the mapping (not just one or more parameters) of it, may be changed, tuned or modified depending on factors such as whether the OBSS PPDU is from an OBSS AP that is part of the same ESS network as the STA 103 or not. In some embodiments, one or more predetermined mappings may be used. The STA 103 may select a first predetermined mapping if the OBSS PPDU is from an OBSS AP that is part of the same ESS network as the STA 103. The STA 103 may select a second predetermined mapping if the OBSS PPDU is not from an OBSS AP that is part of the same ESS network as the STA 103.

In some embodiments, an equation or formula used for the spatial reuse proportional function may be changed, tuned or modified depending on factors such as whether the OBSS PPDU is from an OBSS AP that is part of the same ESS network as the STA 103 or not. The STA 103 may select a first equation or formula if the OBSS PPDU is from an OBSS AP that is part of the same ESS network as the STA 103. The STA 103 may select a second equation or formula if the OBSS PPDU is not from an OBSS AP that is part of the same ESS network as the STA 103.

In an example, in a managed stadium deployment, the management entity could decide to tune one or more parameters such as OBSS PD threshold max, OBSS PD threshold min, a maximum STA 103 transmit power and/or other parameter(s). Such tuning may enable the STAs 103 to be more aggressive in some cases, such as cases in which performance would possibly be improved. For instance, when the OBSS is part of a same ESS network, such tuning may improve system performance. These examples are not limiting.

In some embodiments, APs 102 belonging to a same management domain (such as a same ESS network) may define some parameters of a joint rule, function and/or mapping between STA 103 transmit power and OBSS received power (such as the spatial reuse proportional function). For instance, parameters like OBSS PD threshold min and OBSS PD threshold max shown in FIG. 9 may be defined. However, those parameters may be defined for a list of BSSs that belong to that same management domain, in some cases. Accordingly, the AP 102 and STAs 103 from a BSS belonging to a same management domain can use a spatial reuse proportional function (and/or other rules, mappings and/or functions, in some cases) with specific parameters, but such usage may be restricted to cases in which spatial reuse is performed over OBSSs PPDUs belonging to OBSSs from a same management domain. Accordingly, the AP 102 and STAs 103 from a BSS belonging to a same management domain may (and/or shall in some cases) use a spatial reuse proportional function (and/or other rules, mappings and/or functions, in some cases) with default parameters when spatial reuse is performed over OBSS PPDUs belonging to OBSSs that are not part of the same management domain.

In some cases, such parameters may be communicated by the APs 102 from a particular management domain, along with a list of BSS identifiers (such as BSS identifiers, BSS colors and/or other) of BSSs that belong to the particular management domain. STAs 103 may use the BSS color information of an OBSS PPDU to determine if the OBSS PPDU is from the ESS (such as by checking if the BSS color of the OBSS PPDU is in the list of BSS colors from the ESS) or not from the ESS. If it is from the ESS, specific parameter values (such as for OBSS PD threshold min and/or OBSS PD threshold max for the ESS) may be applied. In a non-limiting example, the BSS color may be included in a header field of a received OBSS PPDU, such as a SIG-A field and/or other.

In some cases, an issue of the above method/operations may arise due to the fact that a number of BSS colors may be limited. For instance, 64 BSS colors may be available in some cases. In some environments, the number of BSS colors may not be sufficient. For instance, when multiple ESSs are present and each ESS uses many APs 102, a large number of BSS colors may be used, and the number may exceed a maximum number available (like 64 in the example above).

In some embodiments, an ESS color parameter (such as a short ESS, SSID and/or other) may be used to indicate the ESS to which the sender of the PPDU belongs. The ESS color parameter may be included in the PPDU, such as in a header. In a non-limiting example, the SIG-A field may be used to communicate the ESS color parameter. STAs 103 may be able to determine whether the PPDU is from the ESS (such as from one of the BSSs of the ESS) using the ESS color parameter. Accordingly, a field in SIG-A may be defined and/or used to encode an ESS color parameter (and/or SSID color parameter), which may enable receiving STA 103 to identify if the PPDU is from its own ESS (such as if the ESS color of the PPDU matches the ESS color of the ESS to which the STA 103 communicates) or not.

Referring to FIG. 10, non-limiting examples of SIG-A fields are shown. The example SIG-A 1000 may include one or more of a TXOP field 1005, SR field 1010, an ESS color field 1015. In some embodiments, the SIG-A 1000 may include one or more additional parameters not shown. The example SIG-A 1050 may include one or more of a TXOP field 1005 and an SR field 1060. In some embodiments, the SIG-A 1050 may include one of more additional parameters not shown. In a non-limiting example, a bit, multiple bits or a field may redefine a meaning of another field to enable communication of the ESS color. For instance, an entry of the TXOP field 1055 may indicate whether the SR field 1060 carries the ESS color. In some embodiments, one or more fields may be used to encode a value of a parameter (such as OBSS PD threshold min, OBSS PD threshold max and/or other) to be used by the STAs 103.

In some embodiments, APs 102 belonging to a management domain (ESS) may define one or more parameters of the spatial reuse proportional function (and/or other rule, function and/or mapping), such as a joint OBSS-PD and STA 103 transmit power proportional rule, for their BSS. For instance, one or more parameters such as an OBSS PD threshold min (lower OBSS power threshold), OBSS PD threshold max (upper OBSS power threshold) and/or other, but only for a list of BSSs that belong to the same management domain (ESS). Accordingly, the AP 102 and/or STAs 103 from a BSS belonging to a management domain may use a rule, function and/or mapping (such as a spatial reuse proportional rule) with specific parameters, but may do so when they perform spatial reuse over OBSS PPDUs belonging to OBSSs from the same management domain. In addition, the AP 102 and/or STAs 103 from a BSS belonging to the management domain may use a rule, function and/or mapping (such as a spatial reuse proportional rule) with default parameters when they perform spatial reuse over OBSS PPDUs belonging to OBSSs that are not part of the same management domain. The specific parameters may be communicated and/or displayed by the APs 102 in the management domain, along with the ESS color (and/or SSID color). The STAs 103 may use the ESS color information (such as in a SIG-A field) of a received OBSS PPDU to determine if the OBSS PPDU is from the ESS network to which the STA 103 communicates or is not (such as by checking if the ESS color in the OBSS PPDU matches an ESS color of the ESS to which the STA 103 communicates. If it is from the same ESS network, specific parameter values of the ESS network, such as for OBSS PD threshold min, OBSS PD threshold max and/or other, may be applied.

FIG. 11 illustrates a non-limiting example scenario in which an STA may communicate in the presence of multiple ESS networks. Such a scenario may occur in a stadium deployment or similar, although the scope of embodiments is not limited in this respect. Embodiments are not limited by the number, type, arrangement or other aspect of APs, ESS networks, and unmanaged APs shown in the example scenario of FIG. 11.

In the example scenario, one or more APs 1120 of a first ESS (managed network) and one or more APs 1130 of a second ESS (managed network) are shown. In addition, an unmanaged AP 1140 is shown. The STA 1110 in this example may communicate with one of the APs 1120 of the first network. The first managed network of multiple APs may be managed by a first controller. A second managed network of multiple APs may be managed by a second controller. In addition, one or more unmanaged APs 1140 (such as soft APs) may be operational. In some cases, coverage of some of the APs of the first network, the APs 102 of the second network and/or the unmanaged APs 102 may at least partly overlap.

The following description of operation of the first ESS network (and/or the APs 1120 of the first ESS network) may be applicable to the second ESS network (and/or the APs 1130 of the second ESS network) in some cases, although the scope of embodiments is not limited in this respect. The BSSs from the APs 1120 of the first network may be assigned with a particular ESS color parameter and may be deployed in accordance with one or more performance criteria. For instance, the deployment may be done in order to maximize throughput and/or other performance metric(s). The first controller may provide, to the APs 1120 of the first network, a set of parameters for a rule, mapping and/or function (such as the spatial reuse proportional rule described previously). Example parameters may include OBSS power thresholds (such as OBSS PD threshold min, OBSS PD threshold max, maximum transmit power and/or other). The first controller may also provide the ESS color on which these parameters may be used. These parameters may be optimized and/or predetermined in accordance with a tradeoff. For instance, a tradeoff between spatial reuse throughput gains and protection for weak users, unmanaged BSSs and/or other devices.

In some cases, a single set of parameters may be used for each AP 1120 of the first ESS that apply to all other APs 1120 of the first ESS (same ESS color). In some cases, there could be a set of parameters that may apply to each (or a group of) APs 1120 of the first ESS (one or multiple BSS colors within the first ESS color). The APs 1120 and/or BSSs of the first ESS network may communicate and/or display these parameters and/or the ESS color on which these parameters may apply in a beacon frame, control frame, management frame and/or other frame(s).

In some embodiments, STAs 103 associated with an AP 1120 and/or BSS of the first ESS network may implement spatial reuse with a spatial reuse proportional rule and may receive these parameters and ESS color. When receiving an OBSS PPDU from one AP 1120 of the first ESS network (with an ESS color matching the ESS color of the first ESS network), the STA 103 may apply spatial reuse mode with the spatial reuse proportional rule and with parameters provided by the AP 102 to which the STA 103 communicates and/or is associated. When receiving an OBSS PPDU from an AP/BSS not included in the first ESS network, such as an unmanaged BSS 1140 or an AP 1130 of the second ESS network (with an ESS color that may matches the ESS color of the second ESS network and/or does not match the ESS color of the first network), the STA 103 may apply spatial reuse mode with the spatial reuse proportional rule using default parameters. For instance, the default parameters may be defined in a standard/specification. Such default parameters may be predetermined, in some cases, to provide a certain level of protection to unmanaged BSSs and/or BSSs of other ESS networks, in some cases. In some embodiments, unmanaged APs 1140, soft APs and/or APs that do not necessarily belong to an ESS network may use a predefined and/or predetermined ESS color value reserved for such APs.

Figure 12:
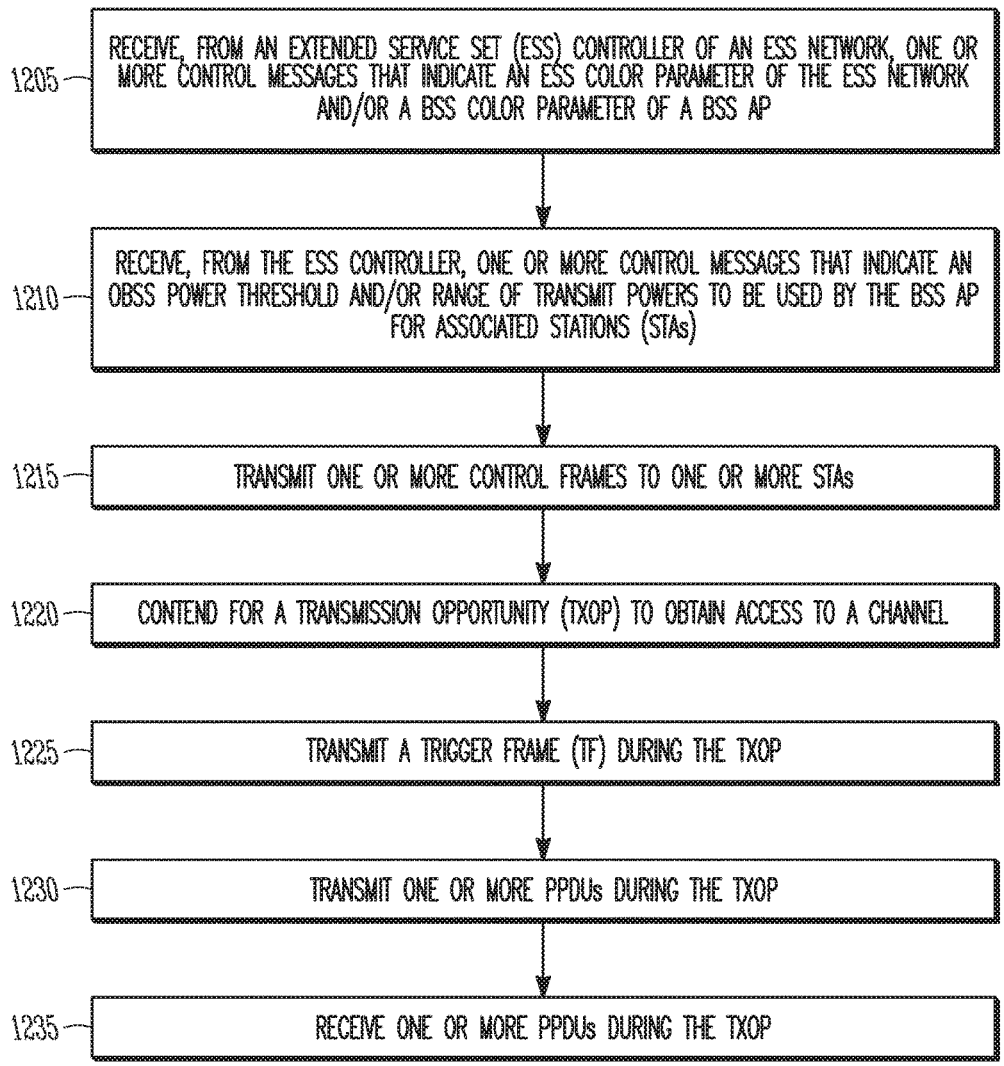
FIG. 12 illustrates the operation of another method of communication in accordance with some embodiments.

FIG. 12 illustrates the operation of another method of communication in accordance with some embodiments. As mentioned previously regarding the method 800, embodiments of the method 1200 may include additional or even fewer operations or processes in comparison to what is illustrated in FIG. 12 and embodiments of the method 1200 are not necessarily limited to the chronological order that is shown in FIG. 12. In describing the method 1200, reference may be made to FIGS. 1-11, although it is understood that the method 1200 may be practiced with any other suitable systems, interfaces and components.

In some embodiments, the AP 102 and/or the STA 103 may be configurable to operate as an HE device 104. Although reference may be made to an AP 102 and/or STA 103 herein, including as part of the descriptions of the method 1200 and/or other methods described herein, it is understood that an HE device 104, AP 102 configurable to operate as an HE device 104 and/or STA 103 configurable to operate as an HE device 104 may be used in some embodiments. In addition, embodiments of the method 1200 may be applicable to APs 102, STAs 103, UEs, eNBs or other wireless or mobile devices. The method 1200 may also be applicable to an apparatus for an AP 102, STA 103 and/or other device described above.

In some embodiments, one or more operations of the method 1200 may be the same as or similar to one or more operations described herein, including but not limited to one or more operations of the method 800. In addition, previous discussion of various techniques and concepts may be applicable to the method 1200 in some cases, including spatial reuse, spatial multiplexing, basic service set (BSS), BSS AP, BSS color, extended service set (ESS), ESS network, ESS color, overlapping basic service set (OBSS), OBSS AP, OBSS power, OBSS PPDU, transmit power, managed networks, managed APs, unmanaged APs, channel contention, TXOP and/or others. In addition, one or more examples shown in any of FIGS. 1-12 may be applicable, in some cases, although the scope of embodiments is not limited in this respect.

It should be noted that the method 1200 may be practiced by an AP 102 and may include exchanging of elements, such as frames, signals, messages, fields and/or other elements, with an STA 103. Similarly, the method 800 may be practiced at an STA 103 and may include exchanging of such elements with an AP 102. In some cases, operations and techniques described as part of the method 800 may be relevant to the method 1200. In addition, embodiments of the method 1200 may include operations performed at the AP 102 that are reciprocal to or similar to other operations described herein performed at the STA 103. For instance, an operation of the method 1200 may include transmission of a message by the AP 102 while an operation of the method 800 may include reception of the same message or similar message by the STA 103.

The AP 102 may operate as a BSS AP 102, in some cases. Accordingly, an STA 103 may transmit PPDUs to the BSS AP 102. Spatial reuse techniques may be used, wherein the STA 103 may perform one or more operations such as those in the method 800.

At operation 1205, the AP 102 may receive, from an extended service set (ESS) controller of an ESS network that manages the AP 102, one or more control messages that indicate an ESS color parameter of the ESS network and/or a BSS color parameter of the BSS AP 102. The ESS color parameter may identify the ESS network. The BSS color parameter may identify the AP 102.

At operation 1210, the AP 102 may receive, from the ESS controller, one or more control messages that indicate an OBSS power threshold and/or range of transmit powers to be used by the BSS AP 102 for associated STAs 103. For instance, the OBSS power threshold may be a threshold that is to be used by associated STAs 103 to determine whether to transmit uplink PPDUs in the presence of one or more overlapping basic service set (OBSS) APs.

At operation 1215, the AP 102 may transmit one or more control frames, management frames, beacon frames and/or other frames to one or more STAs 103. The frame(s) may include one or more parameters such as those received at the AP 102 at operation 1205 and/or 1210.

At operation 1220, the AP 102 may contend for a transmission opportunity (TXOP) to obtain access to a channel. In some embodiments, the AP 102 may contend for a TXOP during which the AP 102 is to control access to the channel. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. The AP 102 may transmit and/or receive one or more frames and/or signals during the period. However, it should be noted that embodiments are not limited to scheduled transmission/reception or to transmission/reception in accordance with the exclusive control of the medium. Accordingly, an MPDU, PPDU, BA frame and/or other frame may be transmitted/received in contention-based scenarios and/or other scenarios, in some embodiments. Any suitable contention methods, operations and/or techniques may be used, which may or may not be part of a standard. In a non-limiting example, one or more contention methods, operations and/or techniques of an 802.11 standard/protocol and/or W-LAN standard/protocol may be used.

At operation 1225, the AP 102 may transmit, during the TXOP, a TF to schedule a transmission of one or more PPDUs from an STA 103 during the TXOP. In some embodiments, a high-efficiency (HE) signal (HE-SIG) field of the PPDU may include the ESS color parameter and/or the BSS color parameter. In a non-limiting example, the HE-SIG field may be a SIG-A field. Embodiments are not limited to usage of the HE-SIG field, however. Other fields may be used, in some cases. In addition, a header and/or payload may include the ESS color parameter and/or the BSS color parameter.

At operation 1230, the AP 102 may transmit one or more PPDUs, to the STA 103 or to another STA 103. In some embodiments, the one or more PPDUs may be transmitted during the TXOP, although the scope of embodiments is not limited in this respect. At operation 1235, the AP 102 may receive one or more PPDUs. For instance, the AP 102 may receive one or more PPDUs from the STA 103. In some embodiments, the one or more PPDUs may be received during the TXOP, although the scope of embodiments is not limited in this respect.

In Example 1, an apparatus of a station (STA) may comprise memory. The apparatus may further comprise processing circuitry. The processing circuitry may be configured to decode a trigger frame (TF) received in a channel from a basic service set (BSS) access point (AP) during a transmission opportunity (TXOP) obtained by the BSS AP. The BSS AP may be included in an extended service set (ESS) network. The processing circuitry may be further configured to detect, in the channel, an overlapping basic service set (OBSS) physical layer convergence procedure protocol data unit (PPDU) from an OBSS AP. The processing circuitry may be further configured to determine a received OBSS power based at least partly on the OBSS PPDU. The processing circuitry may be further configured to determine, based at least partly on an ESS color parameter included in the OBSS PPDU, whether the OBSS AP is included in the ESS network. The processing circuitry may be further configured to, if it is determined that the OBSS AP is included in the ESS network, select a first predetermined value for an OBSS power threshold. The processing circuitry may be further configured to, if it is determined that the OBSS AP is not included in the ESS network, select a second predetermined value for the OBSS power threshold. The processing circuitry may be further configured to determine, based at least partly on a comparison between the received OBSS power and the OBSS power threshold, whether to transmit an uplink PPDU to the BSS AP in the channel during the TXOP.

In Example 2, the subject matter of Example 1, wherein the processing circuitry may be further configured to, if it is determined that the STA is to transmit the uplink PPDU, encode the uplink PPDU for transmission in accordance with uplink scheduling information indicated by the TF.

In Example 3, the subject matter of one or any combination of Examples 1-2, wherein the processing circuitry may be further configured to determine that the STA is to transmit the uplink PPDU if the received OBSS power is less than or equal to the OBSS power threshold. The processing circuitry may be further configured to determine that the STA is to refrain from transmission of the uplink PPDU if the received OBSS power is greater than the OBSS power threshold.

In Example 4, the subject matter of one or any combination of Examples 1-3, wherein the first predetermined value for the OBSS power threshold may be greater than the second predetermined value for the OBSS power threshold.

In Example 5, the subject matter of one or any combination of Examples 1-4, wherein the processing circuitry may be further configured to, if it is determined that the OBSS AP is included in the ESS network, select a first predetermined range of values for a transmit power for the uplink PPDU. The processing circuitry may be further configured to, if it is determined that the OBSS AP is not included in the ESS network, select a second predetermined range of values for the transmit power for the uplink PPDU. The processing circuitry may be further configured to determine the transmit power for the uplink PPDU based on a mapping between the received OBSS power and the selected range of values for the transmit power of the uplink PPDU. At least a portion of the first range of values may be greater than the values of the second range.

In Example 6, the subject matter of one or any combination of Examples 1-5, wherein the OBSS power threshold is a first OBSS power threshold. The processing circuitry may be further configured to, if the received OBSS power is less than or equal to the first OBSS power threshold and if the received OBSS power is greater than a second OBSS power threshold, determine a transmit power for the uplink PPDU in accordance with an inverse linear mapping between the transmit power and the received OBSS power value. The first OBSS power threshold may be greater than the second OBSS power threshold.

In Example 7, the subject matter of one or any combination of Examples 1-6, wherein the processing circuitry may be further configured to, if it is determined that the OBSS AP is included in the ESS network, select a first predetermined value for the second OBSS power threshold. The processing circuitry may be further configured to, if it is determined that the OBSS AP is not included in the ESS network, select a second predetermined value for the second OBSS power threshold.

In Example 8, the subject matter of one or any combination of Examples 1-7, wherein the processing circuitry may be further configured to determine a transmit power for the uplink PPDU based at least partly on a difference between the received OBSS power and the OBSS power threshold.

In Example 9, the subject matter of one or any combination of Examples 1-8, wherein the ESS color parameter may be included in a high efficiency (HE) signal (HE-SIG) field of the OBSS PPDU. A particular value of the ESS color parameter may indicate whether the OBSS AP is included in the ESS. The HE-SIG field may further includes a BSS color parameter that indicates the BSS AP.

In Example 10, the subject matter of one or any combination of Examples 1-9, wherein another particular value of the ESS color parameter may indicate whether the OBSS AP is an unmanaged AP not included in an ESS network.

In Example 11, the subject matter of one or any combination of Examples 1-10, wherein the processing circuitry may be further configured to decode one or more frames from the BSS AP that include the first and second values for the OBSS power threshold.

In Example 12, the subject matter of one or any combination of Examples 1-11, wherein the memory may be configurable to store the first and second predetermined values for the OBSS power threshold.

In Example 13, the subject matter of one or any combination of Examples 1-12, wherein the processing circuitry may include a baseband processor to determine whether to transmit the uplink PPDU.

In Example 14, the subject matter of one or any combination of Examples 1-13, wherein the apparatus may further include a transceiver to receive the TF and to transmit the uplink PPDU.

In Example 15, a non-transitory computer-readable storage medium may store instructions for execution by one or more processors to perform operations for communication by a station (STA). The operations may configure the one or more processors to detect, in a channel, an overlapping basic service set (OBSS) physical layer convergence procedure protocol data unit (PPDU) from an OBSS access point (AP). The operations may further configure the one or more processors to determine, based at least partly on an extended service set (ESS) color parameter included in the OBSS PPDU, whether the OBSS AP is managed by an ESS network. The ESS network may manage a basic service set (BSS) AP to which the STA is associated. The operations may further configure the one or more processors to select either a first set or a second set of transmission parameter values based on whether the OBSS AP is managed by the ESS network. The operations may further configure the one or more processors to determine a received OBSS power based on the detection of the OBSS PPDU. The operations may further configure the one or more processors to determine, based on the selected set of transmission parameter values and the received OBSS power, an uplink transmit power to be used by the STA for an uplink transmission to the BSS AP in the channel.

In Example 16, the subject matter of Example 15, wherein the operations may further configure the one or more processors to decode a trigger frame (TF) received in the channel from the BSS AP during a transmission opportunity (TXOP) obtained by the BSS AP. The operations may further configure the one or more processors to encode an uplink PPDU for the uplink transmission during the TXOP.

In Example 17, the subject matter of one or any combination of Examples 15-16, wherein the set of transmission parameters may include at least an upper OBSS power threshold and a lower OBSS power threshold. The operations may further configure the one or more processors to determine the uplink transmit power based on a mapping between the uplink transmit power and the received OBSS power. In the mapping, in a range of the received OBSS power between the upper and lower OBSS power thresholds, the corresponding uplink transmit power may decrease as the received OBSS power increases.

In Example 18, a method of communication by a station (STA) may comprise decoding a trigger frame (TF) received in a channel from a basic service set (BSS) access point (AP) during a transmission opportunity (TXOP) obtained by the BSS AP. The BSS AP may be included in an extended service set (ESS) network. The method may further comprise detecting, in the channel, an overlapping basic service set (OBSS) physical layer convergence procedure protocol data unit (PPDU) from an OBSS AP. The method may further comprise determining a received OBSS power based at least partly on the OBSS PPDU. The method may further comprise determining, based at least partly on an ESS color parameter included in the OBSS PPDU, whether the OBSS AP is included in the ESS network. The method may further comprise, if it is determined that the OBSS AP is included in the ESS network, selecting a first predetermined value for an OBSS power threshold. The method may further comprise, if it is determined that the OBSS AP is not included in the ESS network, selecting a second predetermined value for the OBSS power threshold. The method may further comprise determining, based at least partly on a comparison between the received OBSS power and the OBSS power threshold, whether to transmit an uplink PPDU to the BSS AP in the channel during the TXOP.

In Example 19, the subject matter of Example 18, wherein the method may further comprise encoding, if it is determined that the STA is to transmit the uplink PPDU, the uplink PPDU for transmission in accordance with uplink scheduling information indicated by the TF.

In Example 20, an apparatus of an access point (AP) configurable to operate as a basic service set (BSS) AP may comprise memory. The apparatus may further comprise processing circuitry. The processing circuitry may be configured to decode one or more control messages from an extended service set (ESS) controller of an ESS network that manages the AP. The control messages may indicate an ESS color parameter that identifies the ESS network and may further indicate a BSS color parameter that identifies the AP. The processing circuitry may be further configured to contend for a transmission opportunity (TXOP) to obtain access to a channel. The processing circuitry may be further configured to encode, for transmission during the TXOP, a trigger frame (TF) to schedule a transmission of a physical layer convergence procedure protocol data unit (PPDU). The processing circuitry may be further configured to encode the PPDU for transmission during the TXOP. A high-efficiency (HE) signal (HE-SIG) field of the PPDU may include the ESS color parameter and the BSS color parameter.

In Example 21, the subject matter of Example 20, wherein the processing circuitry may be further configured to decode a control message from the ESS controller that indicates an overlapping basic service set (OBSS) power threshold to be used by associated stations (STAs) to determine whether to transmit uplink PPDUs in the presence of one or more overlapping basic service set (OBSS) APs. The processing circuitry may be further configured to encode, for transmission to a STA associated with the AP, a control message that indicates the OBSS power threshold.

In Example 22, an apparatus of a station (STA) may comprise means for detecting, in a channel, an overlapping basic service set (OBSS) physical layer convergence procedure protocol data unit (PPDU) from an OBSS access point (AP). The apparatus may further comprise means for determining, based at least partly on an extended service set (ESS) color parameter included in the OBSS PPDU, whether the OBSS AP is managed by an ESS network. The ESS network may manage a basic service set (BSS) AP to which the STA is associated. The apparatus may further comprise means for selecting either a first set or a second set of transmission parameter values based on whether the OBSS AP is managed by the ESS network. The apparatus may further comprise means for determining a received OBSS power based on the detection of the OBSS PPDU. The apparatus may further comprise means for determining, based on the selected set of transmission parameter values and the received OBSS power, an uplink transmit power to be used by the STA for an uplink transmission to the BSS AP in the channel.

In Example 23, the subject matter of Example 22, wherein the apparatus may further comprise means for decoding a trigger frame (TF) received in the channel from the BSS AP during a transmission opportunity (TXOP) obtained by the BSS AP. The apparatus may further comprise means for encoding an uplink PPDU for the uplink transmission during the TXOP.

In Example 24, the subject matter of one or any combination of Examples 22-23, wherein the set of transmission parameters may include at least an upper OBSS power threshold and a lower OBSS power threshold. The operations may further configure the one or more processors to determine the uplink transmit power based on a mapping between the uplink transmit power and the received OBSS power. In the mapping, in a range of the received OBSS power between the upper and lower OBSS power thresholds, the corresponding uplink transmit power may decrease as the received OBSS power increases.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory; and processing circuitry, configured to:
decode a trigger frame (TF) received in a channel from a basic service set (BSS) access point (AP) during a transmission opportunity (TXOP) obtained by the BSS AP, wherein the BSS AP is included in an extended service set (ESS) network;
detect, in the channel, an overlapping basic service set (OBSS) physical layer convergence procedure protocol data unit (PPDU) from an OBSS AP;
determine a received OBSS power based at least partly on the OBSS PPDU;
determine, based at least partly on an ESS color parameter included in the OBSS PPDU, whether the OBSS AP is included in the ESS network;
if it is determined that the OBSS AP is included in the ESS network, select a first predetermined value for an OBSS power threshold;
if it is determined that the OBSS AP is not included in the ESS network, select a second predetermined value for the OBSS power threshold; and
determine, based at least partly on a comparison between the received OBSS power and the OBSS power threshold, whether to transmit an uplink PPDU to the BSS AP in the channel during the TXOP.

2. The apparatus according to claim 1, the processing circuitry further configured to, if it is determined that the STA is to transmit the uplink PPDU, encode the uplink PPDU for transmission in accordance with uplink scheduling information indicated by the TF.

3. The apparatus according to claim 1, the processing circuitry further configured to:
determine that the STA is to transmit the uplink PPDU if the received OBSS power is less than or equal to the OBSS power threshold; and
determine that the STA is to refrain from transmission of the uplink PPDU if the received OBSS power is greater than the OBSS power threshold.

4. The apparatus according to claim 3, wherein the first predetermined value for the OBSS power threshold is greater than the second predetermined value for the OBSS power threshold.

5. The apparatus according to claim 1, the processing circuitry further configured to:
if it is determined that the OBSS AP is included in the ESS network, select a first predetermined range of values for a transmit power for the uplink PPDU;
if it is determined that the OBSS AP is not included in the ESS network, select a second predetermined range of values for the transmit power for the uplink PPDU; and
determine the transmit power for the uplink PPDU based on a mapping between the received OBSS power and the selected range of values for the transmit power of the uplink PPDU,
wherein at least a portion of the first range of values is greater than the values of the second range.

6. The apparatus according to claim 1, wherein:
the OBSS power threshold is a first OBSS power threshold,
the processing circuitry is further configured to:
if the received OBSS power is less than or equal to the first OBSS power threshold and if the received OBSS power is greater than a second OBSS power threshold:
determine a transmit power for the uplink PPDU in accordance with an inverse linear mapping between the transmit power and the received OBSS power value,
wherein the first OBSS power threshold is greater than the second OBSS power threshold.

7. The apparatus according to claim 6, the processing circuitry further configured to:
if it is determined that the OBSS AP is included in the ESS network, select a first predetermined value for the second OBSS power threshold; and
if it is determined that the OBSS AP is not included in the ESS network, select a second predetermined value for the second OBSS power threshold.

8. The apparatus according to claim 1, the processing circuitry further configured to:
determine a transmit power for the uplink PPDU based at least partly on a difference between the received OBSS power and the OBSS power threshold.

9. The apparatus according to claim 1, wherein:
the ESS color parameter is included in a high efficiency (HE) signal (HE-SIG) field of the OBSS PPDU,
a particular value of the ESS color parameter indicates whether the OBSS AP is included in the ESS, and
the HE-SIG field further includes a BSS color parameter that indicates the BSS AP.

10. The apparatus according to claim 9, wherein another particular value of the ESS color parameter indicates whether the OBSS AP is an unmanaged AP not included in an ESS network.

11. The apparatus according to claim 1, the processing circuitry further configured to:
decode one or more frames from the BSS AP that include the first and second values for the OBSS power threshold.

12. The apparatus according to claim 1, wherein the memory is configurable to store the first and second predetermined values for the OBSS power threshold.

13. The apparatus according to claim 1, wherein the processing circuitry includes a baseband processor to determine whether to transmit the uplink PPDU.

14. The apparatus according to claim 1, wherein the apparatus further includes a transceiver to receive the TF and to transmit the uplink PPDU.

15. A non-transitory computer-readable storage medium that stores instructions for execution by one or more processors to perform operations for communication by a station (STA), the operations to configure the one or more processors to:
detect, in a channel, an overlapping basic service set (OBSS) physical layer convergence procedure protocol data unit (PPDU) from an OBSS access point (AP);
determine, based at least partly on an extended service set (ESS) color parameter included in the OBSS PPDU, whether the OBSS AP is managed by an ESS network, wherein the ESS network manages a basic service set (BSS) AP to which the STA is associated;
select either a first set or a second set of transmission parameter values based on whether the OBSS AP is managed by the ESS network;
determine a received OBSS power based on the detection of the OBSS PPDU; and
determine, based on the selected set of transmission parameter values and the received OBSS power, an uplink transmit power to be used by the STA for an uplink transmission to the BSS AP in the channel.

16. The non-transitory computer-readable storage medium according to claim 15, the operations to further configure the one or more processors to:

decode a trigger frame (TF) received in the channel from the BSS AP during a transmission opportunity (TXOP) obtained by the BSS AP; and encode an uplink PPDU for the uplink transmission during the TXOP.

17. The non-transitory computer-readable storage medium according to claim 15, wherein:

the set of transmission parameters includes at least an upper OBSS power threshold and a lower OBSS power threshold, the operations further configure the one or more processors to determine the uplink transmit power based on a mapping between the uplink transmit power and the received OBSS power, and in the mapping, in a range of the received OBSS power between the upper and lower OBSS power thresholds, the corresponding uplink transmit power decreases as the received OBSS power increases.

18. A method of communication by a station (STA), the method comprising:

decoding a trigger frame (TF) received in a channel from a basic service set (BSS) access point (AP) during a transmission opportunity (TXOP) obtained by the BSS AP, wherein the BSS AP is included in an extended service set (ESS) network;

detecting in the channel, an overlapping basic service set (OBSS) physical layer convergence procedure protocol data unit (PPDU) from an OBSS AP;

determining a received OBSS power based at least partly on the OBSS PPDU;

determining based at least partly on an ESS color parameter included in the OBSS PPDU, whether the OBSS AP is included in the ESS network;

if it is determined that the OBSS AP is included in the ESS network, selecting a first predetermined value for an OBSS power threshold;

if it is determined that the OBSS AP is not included in the ESS network, selecting a second predetermined value for the OBSS power threshold; and determining based at least partly on a comparison between the received OBSS power and the OBSS power threshold, whether to transmit an uplink PPDU to the BSS AP in the channel during the TXOP.

19. The method according to claim 18, further comprising:

encoding if it is determined that the STA is to transmit the uplink PPDU, the uplink PPDU for transmission in accordance with uplink scheduling information indicated by the TF.

20. An apparatus of an access point (AP) configurable to operate as a basic service set (BSS) AP, the apparatus comprising: memory; and processing circuitry, configured to:

decode one or more control messages from an extended service set (ESS) controller of an ESS network that manages the AP, wherein the control messages indicate an ESS color parameter that identifies the ESS network and further indicate a BSS color parameter that identifies the AP;

contend for a transmission opportunity (TXOP) to obtain access to a channel;

encode, for transmission during the TXOP, a trigger frame (TF) to schedule a transmission of a physical layer convergence procedure protocol data unit (PPDU); and encode the PPDU for transmission during the TXOP, wherein a high-efficiency (HE) signal (HE-SIG) field of the PPDU includes the ESS color parameter and the BSS color parameter.

21. The apparatus according to claim 20, the processing circuitry further configured to:

decode a control message from the ESS controller that indicates an overlapping basic service set (OBSS) power threshold to be used by associated stations (STAB) to determine whether to transmit uplink PPDUs in the presence of one or more overlapping basic service set (OBSS) APs; and encode, for transmission to a STA associated with the AP, a control message that indicates the OBSS power threshold.

* * * * *

UNITED STATES PATENT AND TRADEMARK OFFICE
CERTIFICATE OF CORRECTION

PATENT NO. : 10,244,543 B2
APPLICATION NO. : 15/391431
DATED : March 26, 2019
INVENTOR(S) : Cariou et al.

Page 1 of 1

It is certified that error appears in the above-identified patent and that said Letters Patent is hereby corrected as shown below:

In the Claims

In Column 33, Line 26, in Claim 18, after "detecting", insert --,--

In Column 34, Line 34, in Claim 21, delete "(STAB)" and insert --(STAs)-- therefor Signed and Sealed this
Fourteenth Day of April, 2020

Andrei Iancu
*Director of the United States Patent and Trademark Office*